Aug. 27, 1963  R. F. STALLMAN  3,101,978
RECIRCULATING ROLLER BEARINGS
Filed June 27, 1960
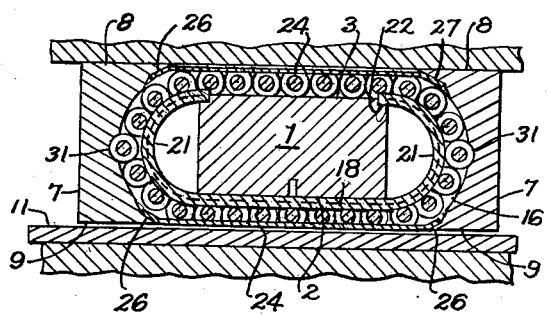
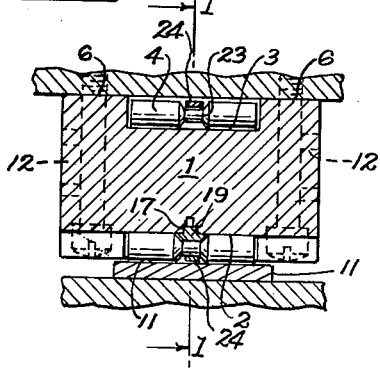
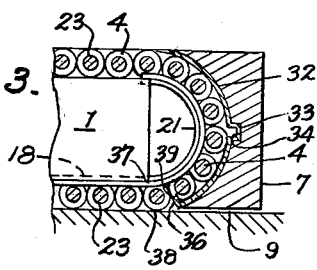
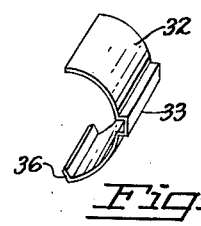
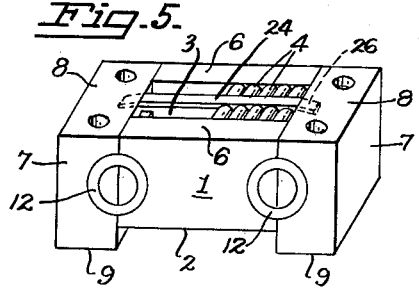
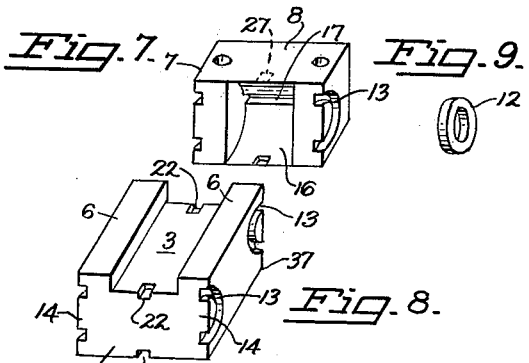
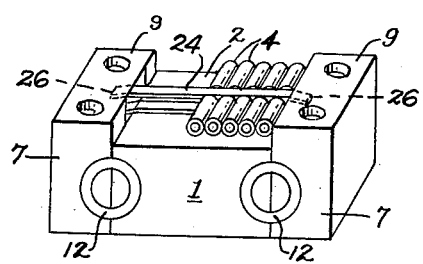
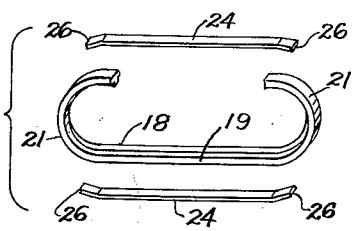
INVENTOR.
RALPH F. STALLMAN
BY George B. White
ATTORNEY.

United States Patent Office 3,101,978
Patented Aug. 27, 1963

3,101,978
RECIRCULATING ROLLER BEARINGS
Ralph F. Stallman, 4800 Reinhardt Drive,
Oakland 19, Calif.
Filed June 27, 1960, Ser. No. 38,870
11 Claims. (Cl. 308—6)

This invention relates to recirculating roller bearings.

Recirculating roller bearings as used in the past on flat races encountered the difficulty of keeping the roller square in their path of travel or at right angles to the directional axes of the races on which they roll. This difficulty is caused by so called skewing. In such recirculating roller bearings there are two distinct zones of travel, namely the load zone facing the flat race on which the bearings travel, and opposite the load zone a free zone over which the rollers roll during their recirculation. In the load zone the rollers are provided with a guide rail to engage the centrally reduced portion of the rollers and thereby to correct skewing as particularly set forth in United States Patent No. 2,334,227 granted to Ralph F. Stallman on November 16, 1943. In the free zone there is no guide rail as the rollers are pushed forcefully through this zone and do not roll.

The primary object of this invention is to provide means for squaring the rollers before the rollers reenter the load zone and also to force the rollers to revolve certain minimum number of turns in the load zone to assure squaring.

It is a further object of the invention to provide a bridge or central member in such bearing units which can be accurately and positively keyed and secured permanently between end pieces so that the race surface of said bridge member can be made flat and can be lapped without shoulders or ribs which latter would make lapping or squaring the surface awkward or impossible; further structural feature of the invention is that the securing elements for fastening the unit to the machine are not located in the central or bridge portion but at the end pieces thereby permitting the heat treatment of the central load carrying portion without setting up stresses and strains otherwise caused by un-uniform section when the holes or areas for such securing elements are in the central or bridge portion.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings. With the foregoing and other objects in view, which will be made manifest in the following detailed description, reference is had to the accompanying drawings for the illustrative embodiment of the invention, wherein:

FIG. 1 is a sectional view of a recirculating bearing constructed in accordance with my invention, the section being taken on line 1—1 of FIG. 2.

FIG. 2 is a cross-sectional view of said bearing.

FIG. 3 is a fragmental sectional view of a modified form of said bearing.

FIG. 4 is a perspective detail view of the guide lining in said modified form.

FIG. 5 is a perspective view of said first form of the bearing showing the free zone on the top.

FIG. 6 is a perspective view of said first form of the bearing, showing the load zone on top.

FIG. 7 is a perspective detail view of one of the end pieces of the bearing.

FIG. 8 is a perspective view of the bridge or middle block of said bearing.

FIG. 9 is a perspective detail view of the key ring or locking ring for locking the end piece and bridge together.

FIG. 10 is a developed view of the roller guide and retaining springs of the bearing, and FIG. 11 is a perspective view of one of the rollers.

The body of the recirculating roller bearing in the present illustration includes a central body or bridge 1, a load zone surface 2 of which is formed truly flat and lapped before assembly so as to form a truly level rolling surface or race. The opposite surface of the central body 1 is parallel with the load zone or race surface 2 and forms a return or free zone surface 3. In the present illustration the sides of the body between the load zone 2 and the free zone 3 are formed generally at right angles to the respective zone surfaces.

The free zone surface of the central body 1 is of a width corresponding to the width of rollers 4 of said bearing and is recessed between longitudinal flanges 6 on said body. The flanges 6 are of the same height so that their outer parallel surfaces are aligned.

At each end of the central body 1 is provided an end piece 7. Each end piece 7 has a top face 8 thereof in registry with the outer edges of the flanges 6 of the free zone surface 3 so as to confine the rollers 4 into a pocket. The bottom face or bearing face 9 of each end piece 7 projects beyond the flat load zone surface 2 to a distance slightly less than the diameter of the roller 4 so as not to contact the bearing surface 11 on which the rollers 4 roll.

The end pieces 7 are permanently secured to the ends of the central body 1 by means of four rings 12 arranged in pairs on the opposite sides of the unit, each ring 12 is set into circular grooves 13. Each groove 13 is formed so that one half thereof is in the respective end piece 7 and the complemental other half thereof is in the adjacent side of the central body 1. The grooves 13 extend to a predetermined depth into the respective sides of the end pieces 7 and of the central body 1 and the rings 12 are of the same height as the depth of the grooves so that when the rings 12 are forced into the respective grooves 13, they form firm securing means for the unit. Each island 14 formed within the complemental grooves 13 is of a slightly larger diameter than the inner diameter of the respective ring 12 so that when the ring is forced into the grooves 13 and around the island 14, then this assembly operation places the ring 12 under tension and thereby improves the tight securing of the end pieces 7 to the central body or bridge 1.

Each end piece 7 is provided on the inside thereof with an arcuate guide channel 16 which channel is so curved that its ends are generally tangential to the respective zone surfaces 2 and 3 of the central body 1. Thus as the series of rollers 4 is rolled on the load zone surface 2 during travel of the bearing, the rollers 4 which are freed from the load zone 2 are pushed around the respective arcuate guide channel 16 and to the free zone surface 3 according to the direction of movements of the bearing. The arcuate guide channels 16 are such as to guide the rollers 4 in their movement from one surface zone to the other.

The load zone surface 2 of the central body 1 is provided with a longitudinal slot 17 into which fits the central boss 18 of a guide rail 19. This guide rail 19 is generally of T-shaped cross-section, the top of T forms the guide rail 19 and the leg of the T forms the boss which is within the slot 17. This guide rail 19 extends the full length of the load zone surface 2 and is then curved into arcuate guide portions 21 which are substantially concentric and parallel with the arcuate guide channels 16 of the respective end pieces 7. The top or free ends of the arcuate guide portions 21 terminate so as to overlap slightly the respective ends of the free zone surface 3 and for this purpose a small socket 22 is formed in each end of the free zone surface 3 in registry with the slot 17 of the load zone surface 2. Thus the ends of the arcuate guide portions 21 are nested in said small sockets 22 and guide the rollers to and from the respective zone surfaces of the central body 1. The guide rail 19 and its arcuate extensions or guide portions project into the reduced portions 23 intermediate the ends of the rollers 4 and correct skewing in the manner set forth in my said patent heretofore identified.

The rollers 4 are kept from falling out of the bearing by means of a retaining spring 24 opposite each of said central body zone surfaces. Each end of each retaining spring 24 is formed into a slightly bent engagement tip 26 and each of such engagement tips 26 is nested in a pocket 27 in the adjacent end of the arcuate guide channel 16. The respective retaining springs 24 are located within the said reduced portions 23 of the rollers 4 and are of a thickness so as to be concealed within said reduced portions so that the rollers 4 project beyond the retaining springs and the latter do not interfere with the rollers 4. The retaining springs 24 are narrower than the width of the reduced portions of the rollers 4, so that the retaining springs 24 float in said reduced portions and do not guide or interfere with the movement of the rollers 4.

In each arcuate guide channel 16 is provided means to align the respective roller 4 as it passes through the channel so that when the roller drops or rolls down to the load zone surface 2 it is squared with respect to the direction of rolling.

In the form shown in FIG. 1 a transverse notch or pocket 31 is provided in each arcuate guide channel 16. This notch 31 is located herein at about the apex of the arcuate guide channel or intermediate between the ends of the guide channel 16 and is of sufficient depth and size to nest a portion of the periphery of the roller 4 as it travels through the guide channel 16. As the roller is forced around the arcuate guide channel 16, it is pushed radially outwardly into the arcuate guide channel 16 and the peripheries of the roller 4 between the reduced portion 23 and the respective ends of the roller 4 are forced into this notch 31 which extends the entire width of the guide channel 16 and is of about the same width as the overall length of the roller 4. Thus the roller 4 is squared with respect to the direction of its travel and as it proceeds through the lower half of the guide channel 16, it proceeds in such a squared attitude.

In the form shown in FIG. 3 each guide channel 16 has an arcuate spring lining 32 which extends the entire length of the guide channel 16. A central rib 33 of the spring lining 32 projects into a transverse notch 34 intermediate the ends of the guide channel 16 and holds the lining 32 in place. The lower edge of the lining 32, namely the edge adjacent the load zone 2, has thereon a lip 36 which craddles the roller 4. This lip 36 is square to the direction of travel of the roller and thus tends to straighten out the roller before it enters the load zone surface 2. This spring lip 36 and the spring lining 32 is capable of yielding sufficiently to permit the passage of the roller 4 as it is pushed to the load zone 2. As noted in FIG. 3, at the moment the roller 4 enters the load zone surface 2 of the bearing, it is straightened out by supporting areas on three lines and is substantially held square in a triangular cradle, the lines of which are the adjacent corner or end 37 of the load zone surface 2, the line of contact at 38 with the surface 11 on which the rollers roll, and the transverse edge 39 of the lip 36 of the spring lining 32 and in this somewhat triangular cradle the roller 4 is held square to the path of travel.

The length of the load zone surface 2 is at least equal to three times the circumference of the roller 4 so that each roller 4 turns at least three times while it traverses the load zone surface 2. In this manner skewing is further prevented.

In operation the skewing of the rollers on the load zone surface is corrected as aforesaid and the relative length of said load zone permits such correction. The rollers returning along the guides in the end pieces from the free zone surface to the load zone surface are straightened so as to be at right angles to the axis of the path of movement. The load zone surface of the herein structure can be finished accurately and then the end pieces of this structure can be accurately and firmly secured to the ends of the race body and the rollers are held positively in the unit and guided operatively, thus greatly enhancing the efficiency of this type of bearings.

I claim:

1. In a recirculating roller bearing, the combination with a central race body and an end piece fixedly secured to each end of said body, said race body having a load bearing face between said end pieces, and having a free zone face on the side opposite said load bearing face, each end piece having a guide channel therein connecting the respective ends of the load bearing face with the adjacent end of said free zone face, a series of individual free rollers extended all around said faces and said guide channel, and freely floating retaining means to prevent the dropping of said rollers off said faces; means positioned in each guide channel for straightening each roller moving through said channel to a transverse attitude at right angles to the path of movement of the roller.

2. In a recirculating roller bearing the combination defined in claim 1, each of said guide channels being arcuate, and said roller straightening means consisting of a pocket formed transversely across the entire width of each channel and nesting adjacent portions of the periphery of a roller.

3. In a recirculating roller bearing the combination defined in claim 1, each of said guide channels being arcuate, and said roller straightening means consisting of a pocket formed transversely across the entire width of each channel and nesting adjacent portions of the periphery of a roller, said pocket being at about the apex of the respective arcuate guide channel.

4. In a recirculating roller bearing a combination as defined in claim 1, wherein each guide channel is arcuate with its convex curve extending outwardly from the adjacent side of said raised body, and said straightening means consisting of a resilient lining held in each guide channel and a resilient lip along the transverse edge of said lining adjacent an end of said load bearing face and inclined toward said face for engaging the entire length of the rolling surface of each roller for aligning the same at right angles to the path of movement on said load bearing face and being capable of being pushed out of the path of said roller as the roller is advanced thereover to said load bearing face.

5. In a recirculating roller bearing a combination as defined in claim 1, wherein each guide channel is arcuate with its convex curve extending outwardly from the adjacent side of said raised body, and said straightening means consisting of a resilient lining held in each guide channel and a resilient lip along the transverse edge of said lining adjacent an end of said load bearing face and inclined toward said face for engaging the entire length of the rolling surface of each roller for aligning the same at right angles to the path of movement on said load bearing face and being capable of being pushed out of the path of said roller as the roller is advanced thereover to said load bearing face, said lip being spaced from the adjacent edge of said load bearing face so that each roller at the line of its entry to said load bearing face is held between said adjacent edge, said lip and the adjacent bearing race.

6. In a recirculating roller bearing a combination as defined in claim 1, wherein each guide channel is arcuate with its convex curve extending outwardly from the adjacent side of said raised body, and said straightening means consisting of a resilient lining held in each guide channel and a resilient lip along the transverse edge of said lining adjacent an end of said load bearing face and inclined toward said face for engaging the entire length of the rolling surface of each roller for aligning the same at right angles to the path of movement on said load bearing face and being capable of being pushed out of the path of said roller as the roller is advanced thereover to said load bearing face, said lip being spaced from the adjacent edge of said load bearing face so that each roller at the line of its entry to said load bearing face is held between said adjacent edge, said lip and the adjacent bearing race, and floating retaining engagement means between the apex of said arcuate lining and said guide channel.

7. In a recirculating roller bearing, the combination defined in claim 1, and a guide rail extended longitudinally of said load bearing face and then continuing upwardly in parallelism with said guide channels to the respective ends of said free zone face, each of said rollers having a reduced portion intermediate the ends thereof located over said guide rail so as to be guided by said guide rail and correct skewing by coaction of the respective shoulders of said reduced portions with respective sides of said guide rail on said load zone face.

8. In a recirculating roller bearing, the combination defined in claim 1, wherein said roller retaining means consist of a retaining flat spring extended along and spaced from said free zone face having its ends in engagement with pockets in the respective engagement ends of said guide channel, each of said rollers having a reduced portion intermediate the ends thereof, said retaining spring being narrower than said reduced portion and floating freely in said end pockets so as not to interfere with the free rolling of said roller.

9. In a recirculating roller bearing the combination defined in claim 1, wherein the securing means to secure said end pieces to said race body include a plurality of securing rings, each end piece has substantially half circular grooves formed on its opposite sides being aligned with the respective adjacent sides of said race body, and said race body having complemental half circular grooves therein, said grooves being of a predetermined depth corresponding to the thickness of said ring, said rings being forced into said grooves for holding the respective end pieces solidly together with said race body.

10. In a recirculating roller bearing the combination defined in claim 9, and a complemental island in the respective grooves being of larger diameter than the inner diameter of the respective rings so as to hold the respective ring under tension when forced into the groove.

11. The recirculating roller bearing defined in claim 1, and said load bearing zone being of a length at least three times the circumference of a roller.

References Cited in the file of this patent
UNITED STATES PATENTS

| | | |
|---|---|---|
| 2,334,227 | Stallman | Nov. 16, 1943 |
| 2,723,886 | Warshaw | Nov. 15, 1955 |
| 3,003,828 | Stark | Oct. 10, 1961 |

FOREIGN PATENTS

| | | |
|---|---|---|
| 1,073,668 | France | Mar. 24, 1954 |